United States Patent
Boragno et al.

(10) Patent No.: US 10,717,832 B2
(45) Date of Patent: *Jul. 21, 2020

(54) LOW DENSITY CARBON FIBERS FILLED MATERIALS

(71) Applicant: BOREALIS AG, Vienna (AT)

(72) Inventors: Luca Boragno, Pichling (AT); Wolfgang Stockreiter, Puchenau (AT); Michael Jerabek, Leonding (AT)

(73) Assignee: BOREALIS AG, Vienna (AT)

( * ) Notice: Subject to any disclaimer, the term of this patent is extended or adjusted under 35 U.S.C. 154(b) by 17 days.

This patent is subject to a terminal disclaimer.

(21) Appl. No.: 15/571,782

(22) PCT Filed: May 20, 2016

(86) PCT No.: PCT/EP2016/061381
§ 371 (c)(1),
(2) Date: Nov. 3, 2017

(87) PCT Pub. No.: WO2016/188886
PCT Pub. Date: Dec. 1, 2016

(65) Prior Publication Data
US 2019/0119456 A1    Apr. 25, 2019

(30) Foreign Application Priority Data
May 22, 2015    (EP) .................... 15168962

(51) Int. Cl.
*C08J 5/04*    (2006.01)
*C08L 23/12*    (2006.01)
*C08L 23/16*    (2006.01)

(52) U.S. Cl.
CPC .............. *C08J 5/042* (2013.01); *C08L 23/12* (2013.01); *C08L 23/16* (2013.01); *C08J 2323/12* (2013.01); *C08J 2423/30* (2013.01); *C08L 2205/025* (2013.01); *C08L 2205/03* (2013.01); *C08L 2207/02* (2013.01)

(58) Field of Classification Search
CPC .......... C08L 51/06; C08L 23/16; C08L 23/12; C08L 23/14; C08L 2207/02; C08J 5/042
See application file for complete search history.

(56) References Cited

U.S. PATENT DOCUMENTS

2007/0155884 A1* 7/2007 Pellegatti .............. C08F 255/02
524/425

FOREIGN PATENT DOCUMENTS

| CA | 2984588 A1 | 12/2016 |
|---|---|---|
| CA | 2984594 A1 | 12/2016 |
| CN | 102604232 A | 7/2012 |
| EP | 2251375 | 11/2010 |
| EP | 2371897 | 10/2011 |
| EP | 2754691 | 7/2014 |
| JP | 9-3298 A | 1/1997 |
| JP | 201053332 A | 3/2010 |
| JP | 2005213478 | 5/2014 |
| RU | 2006127472 A | 2/2008 |
| WO | 99/24478 | 5/1999 |
| WO | 99/24479 | 5/1999 |
| WO | 00/68315 | 11/2000 |
| WO | 2005/073306 A1 | 8/2005 |
| WO | 2009/082019 A1 | 7/2009 |
| WO | 2014/064013 | 5/2014 |
| WO | 2015/005239 A1 | 1/2015 |

OTHER PUBLICATIONS

Kiminori et al., electronic translation of JP 2005-213478, Aug. 11, 2005.*
Office action for Russian Patent Application No. 2017141769104, dated Sep. 27, 2018.
Office action for Canadian Patent Application No. 2983242, dated Oct. 15, 2018.
Busico, Vincenzo, et al., Full Assignment of the 13C NMR Spectra of Regioregular Polypropylenes: Methyl and Methylene Region, Macromolecules 1997, 30, 6251-6263.
Busico, Vincenzo, et al., "Microstructure of polypropylene", Prog. Polym. Sci. 26 (2001) 443-533.
Busico, Vincenzo, et al. "Alk-1-ene Polymerization in the Presence of a Monocyclopentadienyl irconium(IV) Acetamidinate Catalyst: Microstructural and Mechanistic Insights" Macromol. Rapid Commun. 2007, 28, 1128-1134.
Cheng, H.N., "13C NMR Analysis of Ethylene-Propylene Rubbers" Macromolecules 1984, 17, 1950-1955.
European Search Report dated Jun. 21, 2016.
Resconi, Luigi, et al. "Selectivity in Propene Polymerization with Metallocene Catalysts" Chem. Rev. 2000, 100, 1253-1345.
Wang, Wen-Jun, et al. "Structural Analysis of Ethylene/Propylene Copolymers Synthesized with a Constrained Geometry Catalyst", Macromolecules 2000, 33, 1157-1162.
Zhou, Zhe, et al., "A new decoupling method for accurate quantification of polyethylene copolymer composition and triad sequence distribution with 13C NMR" Journal of Magnetic Resonance 187 (2007) 225-233.
Zweifel, Hans, "Plastics Additives Handbook", Nucleating Agents for Semi-Crystalline Polymers, 2001. pp. 956-965.
Office action for Chinese Patent Application No. 2019062001676030, dated Jun. 25, 2019.
Office action for Japanese Patent Application No. 2018-555685, dated Oct. 29, 2019.
Office action for Chinese Patent Application No. 2019122601244020, dated Dec. 31, 2019.
Liang Fujing, "Production and Application of Carbon Fiber Nonwovens", Technical Investigations, vol. 17, No. 6, Dec. 2009.

* cited by examiner

*Primary Examiner* — Jeffrey C Mullis
(74) *Attorney, Agent, or Firm* — Tarolli, Sundheim, Covell & Tummino LLP

(57) ABSTRACT

The present invention refers to a fiber reinforced polymer composition comprising a polypropylene, carbon fibers and a polar modified polypropylene as coupling agent as well as to an article comprising the fiber reinforced polymer composition.

15 Claims, 2 Drawing Sheets

LOW DENSITY CARBON FIBERS FILLED MATERIALS

The present invention refers to a fiber reinforced polymer composition comprising a polypropylene, carbon fibers and a polar modified polypropylene as coupling agent as well as to an article comprising the fiber reinforced polymer composition.

In applications were high stiffness is needed, neat polypropylene is not fulfilling the requirements and needs to be compounded with high stiffness fillers in order to enter market segments which would be otherwise not accessible. By using such fiber reinforced polypropylenes, one can make use of the main advantage of polypropylene, namely of its low density, compared to steel and concrete materials. The fillers typically used are talc and glass fibers which allow the reinforced material to achieve the desired mechanical properties. However, said fillers have a high density and thus again increase the overall density of the fiber reinforced polypropylene. Accordingly, such fillers adversely affect the lightweight benefit of the polypropylene.

Accordingly, the industries seek for a fiber-reinforced composition fulfilling the demanding requirements of well-balanced mechanical properties such as high stiffness and impact at low density.

DETAILED DESCRIPTION OF THE INVENTION

Figure 1:
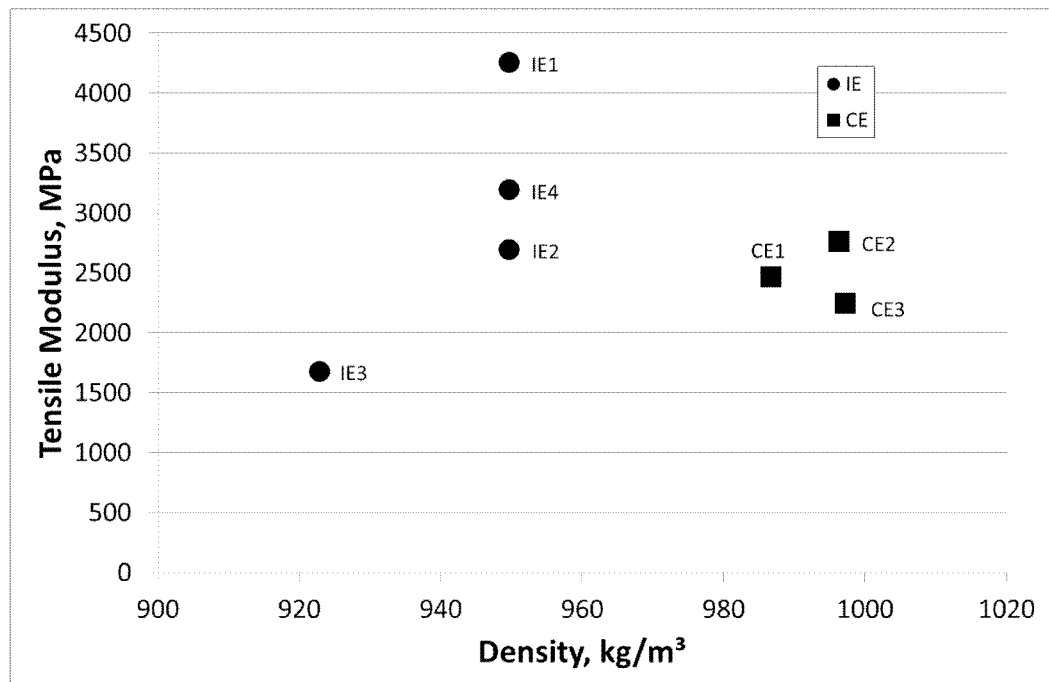
FIG. 1 shows the relationship between the Tensile modulus and density for the inventive and comparative examples.

The finding of the present invention is to use a fiber reinforced polymer composition comprising carbon fibers in combination with a specific polar modified polypropylene in a polypropylene matrix.

Accordingly the present invention is directed to a fiber reinforced polymer composition comprising (a) from 65 to 98.9 wt.-%, based on the total weight of the fiber reinforced polymer composition, of a polypropylene (PP);
(b) from 1 to 10 wt.-%, based on the total weight of the fiber reinforced polymer composition, of carbon fibers (CF); and
(c) from 0.1 to 10 wt.-%, based on the total weight of the fiber reinforced polymer composition, of a polar modified polypropylene (PMP) as coupling agent, wherein the polar modified polypropylene (PMP) comprises groups derived from polar groups in an amount of from 1 to 5 wt.-%, based on the total weight of the polar modified polypropylene (PMP).

In one embodiment, the polypropylene (PP) has
(a) a melt flow rate $MFR_2$ (230° C., 2.16 kg) measured according to ISO 1133 of not more than 100 g/10 min; and/or
(b) a melting temperature $T_m$ of at least 130° C.

In another embodiment, the polypropylene (PP) is a propylene homopolymer (H-PP1) and/or a propylene copolymer (C-PP1).

In yet another embodiment, the propylene copolymer (C-PP1) is a heterophasic propylene copolymer (HECO).

In one embodiment, the carbon fibers (CF) are in the form of a non-woven fabric.

In another embodiment, the non-woven fabric comprises at least 50 wt.-% carbon fibers (CF), based on the total weight of the non-woven fabric.

In yet another embodiment, the carbon fibers (CF) comprise a sizing agent.

In one embodiment, the fiber reinforced polymer composition is free of fibers (F) being selected from the group comprising glass fibers, metal fibers, mineral fibers, ceramic fibers and mixtures thereof.

In another embodiment, the polar modified polypropylene (PMP) comprises groups derived from polar groups selected from the group consisting of acid anhydrides, carboxylic acids, carboxylic acid derivatives, primary and secondary amines, hydroxyl compounds, oxazoline and epoxides, and also ionic compounds.

In yet another embodiment, the polar modified polypropylene (PMP) is a propylene polymer grafted with maleic anhydride.

In one embodiment, the polar modified polypropylene (PMP) is a propylene copolymer grafted with maleic anhydride, preferably the propylene copolymer grafted with maleic anhydride comprises ethylene as comonomer units.

In another embodiment, the fiber reinforced polymer composition further comprises at least one additive in an amount of up to 20 wt.-%, based on the total weight of the fiber reinforced polymer composition.

In yet another embodiment, the fiber reinforced polymer composition has
(a) a density of equal or less than 0.985 g/cm³; and/or
(b) a tensile modulus according to ISO 527-2 of at least 2500 MPa; and/or
(c) a tensile strength according to ISO 527-2 of at least 20 MPa.

Another aspect of the present invention is directed to an article comprising the fiber reinforced polymer composition as defined herein. Preferably, the article is a molded article, more preferably an injection molded article or a foamed article. It is further preferred that the article is a part of washing machines or dishwashers or automotive articles, especially of car interiors and exteriors, like instrumental carriers, shrouds, structural carriers, bumpers, side trims, step assists, body panels, spoilers, dashboards, interior trims and the like.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

In the following the invention is defined in more detail.
The Fiber Reinforced Polymer Composition The fiber reinforced polymer composition according to this invention comprises a polypropylene (PP), carbon fibers (CF), and a polar modified polypropylene (PMP) as coupling agent.

Accordingly, the fiber reinforced polymer composition comprises
(a) from 65 to 98.9 wt.-%, based on the total weight of the fiber reinforced polymer composition, of a polypropylene (PP);
(b) from 1 to 10 wt.-%, based on the total weight of the fiber reinforced polymer composition, of carbon fibers (CF); and
(c) from 0.1 to 10 wt.-%, based on the total weight of the fiber reinforced polymer composition, of a polar modified polypropylene (PMP) as coupling agent, wherein the polar modified polypropylene (PMP) comprises groups derived from polar groups in an amount of from 1 to 5 wt.-%, like 1.0 to 5.0 wt.-%, based on the total weight of the polar modified polypropylene (PMP).

Additionally, the fiber reinforced polymer composition may comprise at least one additive.

Accordingly it is preferred that the fiber reinforced polymer composition comprises
(a) from 65 to 98.9 wt.-%, based on the total weight of the fiber reinforced polymer composition, of a polypropylene (PP);
(b) from 1 to 10 wt.-%, based on the total weight of the fiber reinforced polymer composition, of carbon fibers (CF);
(c) from 0.1 to 10 wt.-%, based on the total weight of the fiber reinforced polymer composition, of a polar modified polypropylene (PMP) as coupling agent, wherein the polar modified polypropylene (PMP) comprises groups derived from polar groups in an amount of from 1 to 5 wt.-%, like 1.0 to 5.0 wt.-%, based on the total weight of the polar modified polypropylene (PMP); and
(d) up to 20 wt.-%, based on the total weight of the fiber reinforced polymer composition, of at least one additive In one embodiment, the fiber reinforced polymer composition according to this invention does not comprise fibers (F) being selected from the group comprising glass fibers, metal fibers, mineral fibers, ceramic fibers and mixtures thereof more preferably, the fiber reinforced polymer composition according to this invention does not comprise fibers (F) other than carbon fibers (CF).

In one embodiment, the fiber reinforced polymer composition according to this invention does not comprise (a) further polymer(s) different to the polymers present in the fiber reinforced polymer composition, i.e. different to the polypropylene (PP), and the polar modified polypropylene (PMP) in an amount exceeding in total 10 wt.-%, preferably exceeding in total 5 wt.-%, based on the total weight of the fiber reinforced polymer composition. Typically if an additional polymer is present, such a polymer is a carrier polymer for additives and thus does not contribute to the improved properties of the claimed fiber reinforced polymer composition.

Accordingly in one specific embodiment the fiber reinforced polymer composition consists of the polypropylene (PP), the polar modified polypropylene (PMP), the carbon fibers (CF), and the optional at least one additive, which might contain low amounts of polymeric carrier material. However this polymeric carrier material is not more than 10 wt.-%, preferably not more than 5 wt.-%, based on the total weight of the fiber reinforced polymer composition, present in said fiber reinforced polymer composition.

Therefore the present invention is especially directed to a fiber reinforced polymer composition comprising
(a) from 65 to 98.9 wt.-%, more preferably from 70 to 95 wt.-%, most preferably from 80 to 93 wt.-%, like from 85 to 92 wt.-%, based on the total weight of the fiber reinforced polymer composition, of a polypropylene (PP);
(b) from 1 to 10 wt.-%, more preferably from 1.5 to 8 wt.-%, most preferably from 2 to 7 wt.-%, like from 3 to 6 wt.-%, based on the total weight of the fiber reinforced polymer composition, of carbon fibers (CF); and
(c) from 0.1 to 10 wt.-%, more preferably from 1 to 8 wt.-%, most preferably from 3 to 7 wt.-%, like from 4 to 6 wt.-%, based on the total weight of the fiber reinforced polymer composition, of a polar modified polypropylene (PMP) as coupling agent, wherein the polar modified polypropylene (PMP) comprises groups derived from polar groups in an amount of from 1 to 5 wt.-%, like 1.0 to 5.0 wt.-%, based on the total weight of the polar modified polypropylene (PMP).

For example, the present invention is directed to a fiber reinforced polymer composition consisting of
(a) from 65 to 98.9 wt.-%, more preferably from 70 to 95 wt.-%, most preferably from 80 to 93 wt.-%, like from 85 to 92 wt.-%, based on the total weight of the fiber reinforced polymer composition, of a polypropylene (PP);
(b) from 1 to 10 wt.-%, more preferably from 1.5 to 8 wt.-%, most preferably from 2 to 7 wt.-%, like from 3 to 6 wt.-%, based on the total weight of the fiber reinforced polymer composition, of carbon fibers (CF);
(c) from 0.1 to 10 wt.-%, more preferably from 1 to 8 wt.-%, most preferably from 3 to 7 wt.-%, like from 4 to 6 wt.-%, based on the total weight of the fiber reinforced polymer composition, of a polar modified polypropylene (PMP) as coupling agent, wherein the polar modified polypropylene (PMP) comprises groups derived from polar groups in an amount of from 1 to 5 wt.-%, like 1.0 to 5.0 wt.-%, based on the total weight of the polar modified polypropylene (PMP); and
(d) up to 20 wt.-%, more preferably from 0.1 to 10 wt.-%, even more preferably from 0.1 to 5 wt.-%, most preferably from 0.1 to 2 wt.-%, like from 0.1 to 0.5 wt.-%, based on the total weight of the fiber reinforced polymer composition, of at least one additive The term "additive" covers also additives which are provided as a masterbatch containing the polymeric carrier material as discussed above. However the term "additive" does not cover nucleating agents, e.g. α-nucleating agents. Typical additives are acid scavengers, antioxidants such as phenolic antioxidant (AO) and the hindered amine light stabilizer (HALS), colorants, pigments such as talc, anti-scratch agents, dispersing agents and carriers.

The term "at least one" additive in the meaning of the present invention means that the additive comprises, preferably consists of, one or more additive(s).

In one embodiment of the present invention, the at least one additive comprises, preferably consists of, one additive. Alternatively, the at least one additive comprises, preferably consists of, a mixture of two or more additives. For example, the at least one antioxidant comprises, preferably consists of, of a mixture of two or three antioxidants.

Preferably, the at least one additive comprises, more preferably consists of, a mixture of two or more additives.

In one embodiment, the fiber reinforced polymer composition comprises talc and optionally further additives. If the fiber reinforced polymer composition comprises talc, talc is preferably present in an amount from 0.1 to 2 wt.-%, more preferably from 0.1 to 0.5 wt.-% and most preferably from 0.3 to 0.5 wt.-%, based on the total weight of the fiber reinforced polymer composition. The talc preferably has a particle size typically used in this area. For example, the talc has a median particle size $d_{50}$ in the range from 0.1 to 5 μm, preferably from 0.5 to 4.5 μm, more preferably from 1 to 4 μm and most preferably from 1.5 to 3.5 μm. Additionally or alternatively, the talc has a particle size $d_{99}$ in the range from 5 to 25 μm, preferably from 8 to 20 μm, more preferably from 9 to 18 μm and most preferably from 10 to 15 μm. Such talc as additive in polymer compositions is available from a great variety of sources, for example, from IMI-Fabi, Italy.

In the meaning of the present invention, the particle size is specified as weight median particle size $d_{50}$ unless indicated otherwise. The $d_{50}$ value is thus the weight median particle size, i.e. 50 wt.-% of all grains are bigger and the remaining 50 wt.-% of grains smaller than this particle size. For determining the weight median particle size $d_{50}$ value a Sedigraph, i.e. the sedimentation method, can be used.

In addition, the fiber reinforced polymer composition contains preferably a α-nucleating agent. Even more preferred the present fiber reinforced polymer composition is free of β-nucleating agents. Accordingly, the nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer, and
(v) mixtures thereof.

Preferably the fiber reinforced polymer composition contains as α-nucleating agent a vinylcycloalkane polymer and/or a vinylalkane polymer.

Such additives and nucleating agents are generally commercially available and are described, for example, in "Plastic Additives Handbook", 5th edition, 2001 of Hans Zweifel.

Preferably the fiber reinforced polymer composition has melt flow rate $MFR_2$ (230° C., 2.16 kg) measured according to ISO 1133 of not more than 75 g/min, preferably in the range of 1 to 75 g/10 min, more preferably in the range of 1 to 60 g/10 min, like in the range of 5 to 50 g/10 min.

In a preferred embodiment the fiber reinforced polymer composition has
(a) a density of equal or less than 0.985 g/cm³, more preferably in the range of 0.800 g/cm3 to 0.985 g/cm³, most preferably in the range of 0.850 g/cm³ to 0.970 g/cm³, like in the range of 0.900 g/cm³ to 0.960 g/cm³; and/or
(b) a tensile modulus according to ISO 527-2 of at least 2500 MPa, more preferably of at least 2600 MPa, most preferably of at least 2800 MPa, like in the range of 3500 MPa to 4500 MPa; and/or
(c) a tensile strength according to ISO 527-2 of at least 20 MPa, more preferably in the range of 20 to 100 MPa, most preferably in the range of 40 to 90, like in the range of 55 MPa to 80 MPa.

For example the fiber reinforced polymer composition has
(a) a density of equal or less than 0.985 g/cm³, more preferably in the range of 0.800 g/cm³ to 0.985 g/cm³, most preferably in the range of 0.850 g/cm³ to 0.970 g/cm³, like in the range of 0.900 g/cm³ to 0.960 g/cm³; or
(b) a tensile modulus according to ISO 527-2 of at least 2500 MPa, more preferably of at least 2600 MPa, most preferably of at least 2800 MPa, like in the range of 3500 MPa to 4500 MPa; or
(c) a tensile strength according to ISO 527-2 of at least 20 MPa, more preferably in the range of 20 to 100 MPa, most preferably in the range of 40 to 90, like in the range of 55 MPa to 80 MPa.

Alternatively, the fiber reinforced polymer composition has
(a) a density of equal or less than 0.985 g/cm³, more preferably in the range of 0.800 g/cm³ to 0.985 g/cm³, most preferably in the range of 0.850 g/cm³ to 0.970 g/cm³, like in the range of 0.900 g/cm³ to 0.960 g/cm³; and
(b) a tensile modulus according to ISO 527-2 of at least 2500 MPa, more preferably of at least 2600 MPa, most preferably of at least 2800 MPa, like in the range of 3500 MPa to 4500 MPa; and
(c) a tensile strength according to ISO 527-2 of at least 20 MPa, more preferably in the range of 20 to 100 MPa, most preferably in the range of 40 to 90, like in the range of 55 MPa to 80 MPa.

In addition, the present invention also relates to a process for the preparation of the fiber reinforced polymer composition as described above and in more detail below, comprising the steps of adding
(a) the polypropylene (PP);
(b) the carbon fibers (CF);
(c) the polar modified polypropylene (PMP);
(d) the optional at least one additive;
to an extruder and extruding the same obtaining said fiber reinforced polymer composition.

The fiber reinforced polymer composition according to the invention may be compounded and pelletized using any of the variety of compounding and blending machines and methods well known and commonly used in the resin compounding art. However, it is preferred using a compounding and blending method that does not affect the carbon fiber dimensions.

For blending the individual components of the instant composition a conventional compounding or blending apparatus, e.g. a Banbury mixer, a 2-roll rubber mill, Buss-co-kneader or a twin screw extruder may be used. The polymer materials recovered from the extruder/mixer are usually in the form of pellets. These pellets are then preferably further processed, e.g. by injection molding to generate articles and products of the inventive composition.

In the following the individual components of the fiber reinforced polymer composition are described in more detail.
The Polypropylene (PP)

The fiber reinforced polymer composition must comprise a polymer component. To achieve the well-balanced mechanical properties such as high stiffness and impact at low density, the polymer must contain a specific polypropylene. Good density values can be inter alia achieved due to the presence of a polypropylene (PP). Preferably, a polypropylene (PP) having a high molecular weight.

In the present invention the term "polypropylene (PP)" encompasses propylene homopolymers and/or propylene copolymers.

Moreover, the term "propylene copolymer" encompasses propylene random copolymers, heterophasic polymers and mixtures thereof.

As known for the skilled person, random propylene copolymer is different from heterophasic polypropylene which is a propylene copolymer comprising a propylene homo or random copolymer matrix component (1) and an elastomeric copolymer component (2) of propylene with one or more of ethylene and $C_4$-$C_8$ alpha-olefin copolymers, wherein the elastomeric (amorphous) copolymer component (2) is dispersed in said propylene homo or random copolymer matrix polymer (1).

In one embodiment of the present invention, the polypropylene (PP) being present in the fiber reinforced polymer composition is a propylene homopolymer (H-PP1) and/or a propylene copolymer (C-PP1). For example, the fiber reinforced polymer composition comprises a propylene homopolymer (H-PP1) and a propylene copolymer (C-PP1). Alternatively, the fiber reinforced polymer composition comprises a propylene homopolymer (H-PP1) or a propylene copolymer (C-PP1).

In one specific embodiment, the fiber reinforced polymer composition comprises a propylene copolymer (C-PP1), preferably a heterophasic propylene copolymer (HECO), as the polypropylene (PP).

In another specific embodiment, the fiber reinforced polymer composition comprises a propylene homopolymer (H-PP1) and a propylene copolymer (C-PP1), preferably a heterophasic propylene copolymer (HECO), as the polypropylene (PP).

In a further specific embodiment, the fiber reinforced polymer composition comprises a propylene homopolymer (H-PP1) as the polypropylene (PP).

It is preferred that the polypropylene (PP) has a melt flow rate $MFR_2$ (230° C., 2.16 kg) measured according to ISO 1133 of not more than 100 g/10 min, more preferably in the range of 2 to 50 g/10 min, still more preferably in the range of 5 to 30 g/10 min, like in the range of 10 to 25 g/10 min.

Additionally or alternatively, the polypropylene (PP) has a melting temperature $T_m$ of at least 130° C., like in the range of 130 to 170° C.

For example, the polypropylene (PP) has a melt flow rate $MFR_2$ (230° C., 2.16 kg) measured according to ISO 1133 of not more than 100 g/10 min, more preferably in the range of 2 to 50 g/10 min, still more preferably in the range of 5 to 30 g/10 min, like in the range of 10 to 25 g/10 min, or a melting temperature $T_m$ of at least 130° C., like in the range of 130 to 170° C.

Preferably, the polypropylene (PP) has a melt flow rate $MFR_2$ (230° C., 2.16 kg) measured according to ISO 1133 of not more than 100 g/10 min, more preferably in the range of 2 to 50 g/10 min, still more preferably in the range of 5 to 30 g/10 min, like in the range of 10 to 25 g/10 min, and a melting temperature $T_m$ of at least 130° C., like in the range of 130 to 170° C.

In the following the polypropylene (PP) being part of the fiber reinforced polymer composition will be defined in more detail.

In one embodiment, the fiber reinforced polymer composition comprises a propylene homopolymer (H-PP1).

The expression propylene homopolymer as used throughout the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable.

In a preferred embodiment, good stiffness is achieved due to the presence of a propylene homopolymer (H-PP1) with moderately high molecular weight. Accordingly it is preferred that the propylene homopolymer (H-PP1) has a melt flow rate $MFR_2$ (230° C., 2.16 kg) measured according to ISO 1133 of not more than 100 g/10 min, more preferably in the range of 2.0 to 50 g/10 min, still more preferably in the range of 5.0 to 30 g/10 min, like in the range of 8.0 to 25 g/10 min.

Additionally or alternatively, the propylene homopolymer (H-PP1) has a melting temperature $T_m$ of at least 140° C., preferably in the range of 140 to 170° C., more preferably in the range of 150 to 170° C., like in the range of 155 to 170° C.

Preferably, the propylene homopolymer (H-PP1) has a melt flow rate $MFR_2$ (230° C., 2.16 kg) measured according to ISO 1133 of not more than 100 g/10 min, more preferably in the range of 2.0 to 50 g/10 min, still more preferably in the range of 5.0 to 30 g/10 min, like in the range of 8.0 to 25 g/10 min; and a melting temperature $T_m$ of at least 140° C., preferably in the range of 140 to 170° C., more preferably in the range of 150 to 170° C., like in the range of 155 to 170° C.

The propylene homopolymer (H-PP1) preferably features a low amount of xylene cold solubles (XCS), i.e. of ≤4.0 wt.-%, preferably in the range from 0.1 to 4.0 wt.-%, more preferably in the range from 0.1 to 3.0 wt.-% and most preferably in the range from 0.1 to 2.5 wt.-%.

The propylene homopolymer (H-PP1) is preferably an isotactic propylene homopolymer. Accordingly, it is appreciated that the propylene homopolymer (H-PP1) has a rather high isotactic pentad concentration, i.e. higher than 90 mol-%, more preferably higher than 92 mol-%, still more preferably higher than 93 mol-% and yet more preferably higher than 95 mol-%, like higher than 97 mol-%.

The propylene homopolymer (H-PP1) is state of the art and commercially available. A suitable propylene homopolymer is for instance Bormed HF955MO of Borealis AG.

Additionally or alternatively, the polypropylene (PP) is a propylene copolymer (C-PP1).

The term "propylene copolymer (C-PP1)" covers random propylene copolymers (RC-PP1) as well as complex structures, like heterophasic systems. Preferably the propylene copolymer (C-PP1) is a heterophasic propylene copolymer (HECO).

The term "random propylene copolymer" denotes a copolymer of propylene monomer units and comonomer units, in which the comonomer units are randomly distributed in the polymeric chain. Thus, a random copolymer is different from a heterophasic copolymer comprising a matrix phase and an elastomeric phase dispersed therein, as described in detail below. Accordingly, the random propylene copolymer (RC-PP1) does not contain an elastomeric polymer phase dispersed therein, i.e. is monophasic and has just one glass transition temperature. However, the random propylene copolymer (RC-PP1) can be the matrix phase of a heterophasic propylene copolymer (HECO). The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Thus, the random propylene copolymer (RC-PP1) preferably comprises, preferably consist of, units derived from
(i) propylene and
(ii) ethylene and/or at least one $C_4$ to $C_{20}$ α-olefin, preferably at least one α-olefin selected from the group consisting of ethylene, 1-butene, 1-pentene, 1-hexene and 1-octene, more preferably ethylene and/or 1-butene, yet more preferably ethylene.

Accordingly, the random propylene copolymer (RC-PP1) may comprise units derived from propylene, ethylene and optionally at least another $C_4$ to $C_{10}$ α-olefin. In one embodiment of the present invention, the random propylene copolymer (RC-PP1) comprises units derived from propylene, ethylene and optionally at least another α-olefin selected from the group consisting of $C_4$ α-olefin, $C_5$ α-olefin, $C_6$ α-olefin, $C_7$ α-olefin, $C_8$ α-olefin, $C_9$ α-olefin and $C_{10}$ α-olefin. More preferably the random propylene copolymer (RC-PP1) comprises units derived from propylene, ethylene and optionally at least another α-olefin selected from the group consisting of 1-butene, 1-pentene, 1-hexene, 1-heptene, 1-octene, 1-nonene and 1-decene, wherein 1-butene and 1-hexene are preferred. It is in particular preferred that the random propylene copolymer (RC-PP1) consists of units derived from propylene and ethylene. Preferably, the units derivable from propylene constitutes the main part of the propylene copolymer (C-PP1), i.e. at least 80 wt.-%, more preferably of at least 85 wt.-%, still more preferably of 80 to 99.5 wt.-%, yet more preferably of 85 to 99.5 wt.-%, still more preferably of 90 to 99.2 wt.-%, based on the total weight of the random propylene copolymer (RC-PP1). Accordingly, the amount of units derived from $C_2$ to $C_{20}$ α-olefins other than propylene in the random propylene copolymer (RC-PP1) is in the range of 0.5 to 20 wt.-%, more preferably of 0.5 to 15 wt.-%, still more preferably of 0.8 to 10 wt.-%, based on the total weight of the random propylene copolymer (RC-PP1). It is in particular appreciated that the amount of ethylene in the random propylene copolymer (RC-PP1), in particular in case the random propylene copolymer (RC-PP1) comprises only units derivable from propylene and ethylene, is in the range of 0.5 to 15 wt.-%, preferably of 0.8 to 10 wt.-%, more preferably of 0.8 to 8.0 wt.-%, based on the total weight of the random propylene copolymer (RC-PP1).

Additionally, it is appreciated that the random propylene copolymer (RC-PP1) has a melting temperature $T_m$ of at least 130° C., preferably in the range of 130 to 160° C., more preferably in the range of 135 to 158° C., like in the range of 140 to 155° C.

Concerning the melt flow rate $MFR_2$ (230° C.), is appreciated that the random propylene copolymer (RC-PP1) preferably has a melt flow rate $MFR_2$ (230° C.) measured according to ISO 1133 of not more than 100 g/10 min, more preferably in the range of 2.0 to 50 g/10 min, still more preferably in the range of 5.0 to 30 g/10 min, like in the range of 8.0 to 25 g/10 min.

In one specific embodiment of the present invention, the polypropylene (PP) is a heterophasic propylene copolymer (HECO) or a mixture of a heterophasic propylene copolymer (HECO) and propylene homopolymer (H-PP1) and/or a random propylene copolymer (RC-PP1), more preferably the polypropylene (PP) is a heterophasic propylene copolymer (HECO) or a mixture of a heterophasic propylene copolymer (HECO) and propylene homopolymer (H-PP1).

Preferably the heterophasic propylene copolymer (HECO) comprises
a) a polypropylene matrix (M-HECO), and
b) an elastomeric propylene copolymer (E).

The expression "heterophasic" indicates that the elastomeric copolymer (E) is preferably (finely) dispersed at least in the polypropylene matrix (M-HECO) of the heterophasic propylene copolymer (M-HECO). In other words the elastomeric copolymer (E) forms inclusions in the polypropylene matrix (M-HECO). Thus, the polypropylene matrix (M-HECO) contains (finely) dispersed inclusions being not part of the matrix and said inclusions contain the elastomeric copolymer (E). The term "inclusion" according to this invention shall preferably indicate that the matrix and the inclusion form different phases within the heterophasic propylene copolymer (M-HECO), said inclusions are for instance visible by high resolution microscopy, like electron microscopy or scanning force microscopy. Furthermore, the heterophasic propylene copolymer (HECO) preferably comprises as polymer components only the polypropylene matrix (M-HECO) and the elastomeric copolymer (E). In other words the heterophasic propylene copolymer (HECO) may contain further additives but no other polymer in an amount exceeding 5 wt.-%, more preferably exceeding 3 wt.-%, like exceeding 1 wt.-%, based on the total heterophasic propylene copolymer (HECO), more preferably based on the polymers present in the heterophasic propylene copolymer (HECO). One additional polymer which may be present in such low amounts is a polyethylene which is a reaction product obtained by the preparation of the heterophasic propylene copolymer (HECO). Accordingly, it is in particular appreciated that a heterophasic propylene copolymer (HECO) as defined in the instant invention contains only a polypropylene matrix (M-HECO), an elastomeric copolymer (E) and optionally a polyethylene in amounts as mentioned in this paragraph.

The elastomeric copolymer (E) is preferably an elastomeric propylene copolymer (E1).

As explained above a heterophasic propylene copolymer (HECO) comprises a polypropylene matrix (M-HECO) in which the elastomeric copolymer (E), such as the elastomeric propylene copolymer (E1), is dispersed.

The polypropylene matrix (M-HECO) can be a propylene homopolymer (H-PP2) or a random propylene copolymer (RC-PP2).

However, it is preferred that the propylene matrix (M-HECO) is a propylene homopolymer (H-PP2).

The polypropylene matrix (M-HECO) being a propylene homopolymer (H-PP2) has a rather low xylene cold soluble (XCS) content, i.e. of not more than 3.5 wt.-%, preferably of not more than 3.0 wt.-%, like not more than 2.6 wt.-%, based on the total weight of the polypropylene matrix (M-HECO). Thus, a preferred range is 0.5 to 3.0 wt.-%, more preferred 0.5 to 2.5 wt.-%, based on the total weight of the propylene homopolymer (H-PP2).

In one embodiment of the present invention, the polypropylene matrix (M-HECO) is a propylene homopolymer (H-PP2) having a melt flow rate $MFR_2$ (230° C.) from 2.0 to 700 g/10 min, more preferably of from 4.0 to 400 g/10 min, still more preferably of from 15.0 to 200 g/10 min and most preferably of from 20.0 to 100 g/10 min.

If the polypropylene matrix (M-HECO) is a random propylene copolymer (RC-PP2), the random propylene copolymer (RC-PP2) preferably comprises, preferably consist of, units derived from (i) propylene and
(ii) ethylene and/or at least one $C_4$ to $C_8$ α-olefin, preferably at least one α-olefin selected from the group consisting of ethylene, 1-butene, 1-pentene, 1-hexene and 1-octene, more preferably ethylene and/or 1-butene, yet more preferably ethylene.

Accordingly, the random propylene copolymer (RC-PP2) may comprise units derived from (i) propylene and (ii) ethylene and/or at least one $C_4$ to $C_8$ α-olefin. In one embodiment of the present invention the random propylene copolymer (RC-PP2) comprises units derived from (i) propylene and (ii) an at least one α-olefin selected from the group consisting of ethylene 1-butene, 1-hexene and 1-octene. It is in particular preferred that the random propylene copolymer (RC-PP2) consists of units derived from propylene and ethylene. Preferably, the units derivable from propylene constitutes the main part of the random propylene copolymer (RC-PP2), i.e. at least 92 wt.-%, preferably of at least 95 wt.-%, more preferably of at least 98 wt.-%, still more preferably of 92 to 99.5 wt.-%, yet more preferably of 95 to 99.5 wt.-%, still more preferably of 98 to 99.2 wt.-%, based on the total weight of the random propylene copolymer (RC-PP2).

Furthermore, it is appreciated that the xylene cold soluble (XCS) content of the polypropylene matrix (M-HECO) being a random propylene copolymer (RC-PP2) is a rather low. Accordingly, the propylene copolymer (C-PP2) has preferably a xylene cold soluble (XCS) fraction measured according to ISO 6427 (23° C.) of not more than 14 wt-%, more preferably of not more than 13 wt.-%, yet more preferably of not more than 12 wt.-%, like not more than 11.5 wt.-%, based on the total weight of the propylene copolymer (C-PP2). Thus, a preferred range is 1 to 14 wt.-%, more preferred 1.0 to 13 wt.-%, still more preferred 1.2 to 11 wt.-%, based on the total weight of the propylene copolymer (C-PP2).

In one embodiment of the present invention, the random propylene copolymer (C-PP2) has a melt flow rate $MFR_2$ (230° C.) from 2.0 to 700 g/10 min, more preferably of from 4.0 to 400 g/10 min, still more preferably of from 15.0 to 200 g/10 min and most preferably of from 20.0 to 100 g/10 min.

The second component of the heterophasic propylene copolymer (HECO) is the elastomeric copolymer (E). As mentioned above the elastomeric copolymer (E) is preferably an elastomeric propylene copolymer (E1). In the following both elastomers are defined more precisely.

Preferably the elastomeric propylene copolymer (E1) comprises units derived from (i) propylene and (ii) ethylene and/or $C_4$ to $C_{20}$ α-olefins, preferably from (i) propylene and (ii) selected from the group consisting of ethylene, 1-butene, 1-hexene, and 1-octene. Preferably the propylene content in the elastomeric propylene copolymer (E1) is at least 40 wt.-%, more preferably at least 45 wt.-%. Thus in one preferred embodiment the elastomeric propylene copolymer (E1) comprises 40.0 to 85.0 wt.-%, more preferably 45.0 to 80 wt.-%, units derivable from propylene. The comonomers present in the elastomeric propylene copolymer (E1) are preferably ethylene and/or $C_4$ to $C_{20}$ α-olefins, like ethylene, 1-butene, 1-hexene and 1-octene. In one specific embodiment elastomeric propylene copolymer (E1) is a propylene-ethylene polymer. In one embodiment of the present invention, the elastomeric propylene copolymer (E1) is an ethylene propylene rubber (EPR1) with the amounts given in this paragraph.

Preferably the amount of the elastomeric copolymer (E), like the elastomeric propylene copolymer (E1), within the heterophasic propylene copolymer (HECO) ranges from 15 to 45 wt.-%, more preferably in the range of 20 to 40 wt.-%, like in the range of 25 to 35 wt.-%.

The intrinsic viscosity (IV) of the xylene cold soluble (XCS) fraction of the heterophasic propylene copolymer (HECO) is preferably moderate. Accordingly, it is appreciated that the intrinsic viscosity of the xylene cold soluble (XCS) fraction of the heterophasic propylene copolymer (HECO) is below 3.3 dl/g, more preferably below 3.1 dl/g, and most preferably below 3.0 dl/g. Even more preferred the intrinsic viscosity of the xylene cold soluble (XCS) fraction of the heterophasic propylene copolymer (HECO) is in the range of 1.5 to 3.3 dl/g, more preferably in the range 2.0 to 3.1 dl/g, still more preferably 2.2 to 3.0 dl/g.

It is especially preferred that heterophasic propylene copolymer (HECO) comprises a propylene homopolymer (H-PP2) as the polypropylene matrix (M-HECO) and an ethylene propylene rubber (EPR1) as the elastomeric propylene copolymer (E1).

Preferably, the heterophasic propylene copolymer (HECO) has a melt flow rate $MFR_2$ (230° C.) of not more than 100 g/10 min, more preferably in the range of 2 to 50 g/10 min, still more preferably in the range of 5.0 to 30 g/10 min, like in the range of 8.0 to 25 g/10 min.

In one embodiment, the instant fiber reinforced polymer composition comprises a heterophasic propylene copolymer (HECO) as the polypropylene (PP).

In another embodiment, the instant fiber reinforced polymer composition comprises a heterophasic propylene copolymer (HECO) and a propylene homopolymer (H-PP1) as the polypropylene (PP).

In this case, it is appreciated that the heterophasic propylene copolymer (HECO) and the propylene homopolymer (H-PP1) are present in the instant fiber reinforced polymer composition in a specific weight ratio in order to ensure well-balanced mechanical properties at low density. In particular, it is preferred that the heterophasic propylene copolymer (HECO) and the propylene homopolymer (H-PP1) are present in the instant fiber reinforced polymer composition in a weight ratio ranging from 3:1 to 1:3, more preferably from 2:1 to 1:2, such as of about 1:1.

In another embodiment, especially if very high stiffness is required rather than high impact performance, the instant fiber reinforced polymer composition comprises a propylene homopolymer (H-PP1) only as the polypropylene (PP).

The polypropylene (PP) may comprise a nucleating agent which is preferably a polymeric nucleating agent, more preferably an alpha-nucleating agent, e.g. a polymeric alpha-nucleating agent.

The (alpha)-nucleating agent content of the polypropylene (PP), or of one of its components, preferably of the polypropylene (PP), is preferably up to 5.0 wt.-%. In a preferred embodiment, the polypropylene (PP) or of one of its components, preferably of the polypropylene (PP), contains not more than 3000 ppm, more preferably of 1 to 2000 ppm of a (a)-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

In a preferred embodiment the polypropylene (PP) or one of its components contains a vinylcycloalkane, like vinylcyclohexane (VCH), polymer and/or vinylalkane polymer, as the preferable alpha-nucleating agent. Preferably in this embodiment the polypropylene (PP) contains a vinylcycloalkane, like vinylcyclohexane (VCH), polymer and/or vinylalkane polymer, preferably vinylcyclohexane (VCH).

The nucleating agent can be introduced as a masterbatch. Alternatively some alpha-nucleating agents as defined in the present invention, can be also introduced by BNT-technology as described below.

The nucleating agent may be introduced to the polypropylene (PP) or one of its components e.g. during the polymerisation process of the polypropylene (PP) or one of its components or may be incorporated to the propylene copolymer in the form of masterbatch (MB) together with e.g. a carrier polymer.

In case of the embodiment of a masterbatch (MB) incorporation the masterbatch (MB) contains a nucleating agent, which is preferably a polymeric nucleating agent, more preferably alpha-nucleating agent, most preferably a vinylcycloalkane, like vinylcyclohexane (VCH), polymer and/or vinylalkane polymer, preferably vinylcyclohexane (VCH) polymer, as defined above or below, in an amount of not more than 500 ppm, more preferably of 1 to 200 ppm, and still more preferably of 5 to 100 ppm, based on the weight of the masterbatch (MB) (100 wt. %). In this embodiment, more preferably, said masterbatch (MB) is present in an amount of not more than 10.0 wt.-%, more preferably not more than 5.0 wt.-% and most preferably not more than 3.5 wt.-%, with the preferred amount of masterbatch (MB) being from 1.5 to 3.5 wt.-%, based on the total amount of the polypropylene (PP). Most preferably the masterbatch (MB) comprises, preferably consists of the homopolymer or copolymer, preferably homopolymer, of propylene which has been nucleated according to BNT-technology as described below.

It is preferred that the nucleating agent is introduced to the polypropylene (PP) during the polymerisation process of one of the components of the polypropylene (PP). The nucleating agent is preferably introduced to the polypropylene (PP) or one of its components by first polymerising the above defined vinyl compound, preferably vinylcycloalkane, as defined above or below, in the presence of a catalyst system comprising a solid catalyst component, preferably a solid Ziegler Natta catalyst component, a cocatalyst and optional external donor, and the obtained reaction mixture of the polymer of the vinyl compound, preferably vinyl cyclohexane (VCH) polymer, and the catalyst system is then used for producing the polypropylene (PP) or one of its components. The above incorporation of the polymeric nucleating agent to the polypropylene (PP) during the polymerization of said propylene copolymer is called herein as BNT-technology as described below.

Said obtained reaction mixture is herein below referred interchangeably as modified catalyst system.

Preferably the vinylcycloalkane is vinylcyclohexane (VCH) polymer which is introduced into the propylene copolymer by the BNT technology.

More preferably in this preferred embodiment, the amount of vinylcycloalkane, like vinylcyclohexane (VCH), polymer and/or vinylalkane polymer, more preferably of vinylcyclohexane (VCH) polymer, in the polypropylene (PP), or of one of its components, preferably of the polypropylene (PP), is not more than 500 ppm, more preferably of 1 to 200 ppm, most preferably 5 to 100 ppm.

With regard to the BNT-technology reference is made to the international applications WO 99/24478, WO 99/24479 and particularly WO 00/68315. According to this technology a catalyst system, preferably a Ziegler-Natta procatalyst, can be modified by polymerising a vinyl compound in the presence of the catalyst system, comprising in particular the special Ziegler-Natta procatalyst, an external donor and a cocatalyst, which vinyl compound has the formula:

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the polypropylene (PP) according to this invention. The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

The Carbon Fibers (CF)

It is appreciated that the fiber reinforced polymer composition shall have well-balanced mechanical properties such as high stiffness and high impact. In order to ensure an excellent stiffness, the fiber reinforced polymer composition comprises carbon fibers (CF). Thus, one essential component of the fiber reinforced polymer composition is the carbon fibers (CF).

The carbon fibers (CF) used in the fiber reinforced polymer composition have preferably an average length of from 0.5 to 300 mm, more preferably from 1.0 to 250 mm, for example 1.5 to 200 mm. More preferably, the carbon fibers (CF) used in the fiber reinforced polymer composition are preferably endless carbon fibers (CF). The carbon fibers preferably have an average diameter of from 2 to 30 μm, more preferably from 3 to 25 μm and most preferably from 5 to 20 μm.

Preferably, the carbon fibers (CF) have a density of from 1.3 to 2.2 $g/cm^3$, more preferably from 1.4 to 2.1 $g/cm^3$, most preferably from 1.5 to 1.9 $g/cm^3$.

Preferably, the carbon fibers (CF) are in the form of a non-woven fabric.

Preferably, the non-woven fabric comprises at least 50 wt.-% carbon fibers (CF), more preferably at least 65 wt.-% carbon fibers, even more preferably at least 75 wt.-% carbon fibers (CF) and most preferably at least 80 wt.-%, based on the total weight of the non-woven fabric.

The non-woven fabric according to the invention may comprise polymeric compounds such as sizing agents and/or sewing threads.

It is appreciated that the non-woven fabric may be a recycled material which may contain additional compounds besides the preferred carbon fibers, e.g. sizing agents, glass fibers, sewing threads in a minor amount etc., depending on the intended first use.

In one embodiment, the non-woven fabric is free of polymeric materials. The carbon fibres are not considered to be polymeric materials.

If present, the amount of sewing thread is normally within the range of 0.25 to 10 wt. %, preferably within the range of 0.5 to 7.5 wt. % and most preferably within the range of 1.0 to 3.0 wt. % based on the total weight of the non-woven fabric. Suitable sewing threads are for example polyester fibres.

In one embodiment, the carbon fibers (CF), preferably the non-woven fabric, comprise a sizing agent in order to improve its wetting and coupling to the polymer matrix. Preferably, the carbon fibers (CF), preferably the non-woven fabric, comprise sizing agents on the surface of the fibers. Preferably, the carbon fibers (CF), preferably the non-woven fabric, comprise a sizing agent selected from epoxy resins, polyether-modified epoxy resins, polyurethane, amino-silane grafted polypropylene.

In one especially preferred embodiment, the carbon fibers (CF), preferably the non-woven fabric, comprise an epoxy-resin, more preferably a polyether-modified epoxy resin, as sizing agent. A suitable sizing agent is for example Duroxy SEF 968w distributed by Cytec. Film formers, lubricants, stabilizers and antistatic agents may also be comprised in the sizing agent.

Usually the amount of such sizing agent is 15 wt.-% or less, more preferably 10 wt.-% or less, and most preferably 7.5 wt.-% or less, based on the total weight of the carbon fibers (CF), preferably the non-woven fabric.

The non-woven fabric may be a recycled material which may contain these (and possibly also other) additional compounds besides the preferred carbon fibres.

In case the carbon fibers (CF) are in the form of a non-woven fabric, the non-woven fabric is preferably in the form of a stripe.

Usually the width of the stripe is not more than 300 mm. Preferably the stripe has a width of 10 to 300 mm, preferably a width of 25 to 250 mm and most preferably a width of 40 to 200 mm. Additionally or alternatively, the stripe preferably has a length of at least 50 cm, more preferably of at least 150 cm, and most preferably of at least 250 cm.

The stripe may be in the form of a reel. Thus, the length is not particularly limited. However, the length is not particularly limited, i.e. the stripe may be a so-called "endless stripe".

The average weight of the non-woven fabric is preferably within the range of 100 to 1000 g/m$^2$, more preferably within the range of 150 to 800 g/m$^2$ and most preferably within the range of 250 to 650 g/m$^2$.

The non-woven fabric is further characterised by a constant weight per area. Thus, the difference in weight between two sections of the non-woven fabric having an identical area expressed as the quotient of the section having the higher weight to the section having the lower weight is preferably within 10%, more preferably within 5%.

The preparation of non-woven fabric from carbon fibers (CF), e.g. rovings, or recycled material which may be in the form of a laid web, is well-known in the art. Suitable processes are, for example needle punching.

Preferably, the non-woven fabric is in the form of a non-woven fabric, preferably obtained by needle-punching It is appreciated that the carbon fibers (CF) are preferably the only fibers present in the instant fiber reinforced polymer composition. Thus, the fiber reinforced polymer composition is preferably free of fibers (F) being selected from the group comprising glass fibers, metal fibers, mineral fibers, ceramic fibers and mixtures thereof. More preferably, the fiber reinforced polymer composition is free of fibers (F) other than the carbon fibers (CF).

In one embodiment, the fiber reinforced polymer composition is free of fibers (F) having an average diameter of more than 15 μm, preferably of more than 12 μm and most preferably of more than 9 μm. Additionally or alternatively, the fiber reinforced polymer composition is free of fibers (F) having an average diameter of less than 2 μm, preferably of less than 3 μm and most preferably of less than 5 μm.

The Polar Modified Polypropylene (PMP) as Coupling Agent

In order to achieve an easier and more uniform dispersion of the carbon fibers (CF) in the polymer components which act in the fiber reinforced polymer composition as a matrix, the fiber reinforced polymer composition comprises a specific coupling agent.

The coupling agent according to this invention is a specific polar modified polypropylene (PMP).

The polar modified polypropylene (PMP) preferably is a polypropylene containing polar groups. In the following the polypropylene will be defined more precisely which is subsequently modified to the polar modified polypropylene (PMP) as explained in detail below.

The polypropylene is preferably a propylene homopolymer or a random propylene copolymer, like a copolymer of (i) propylene and (ii) ethylene and/or $C_4$ to $C_{12}$ α-olefins, preferably from (i) propylene and (ii) an α-olefin selected from the group consisting of ethylene, 1-butene, 1-hexene, and 1-octene. Concerning the definition of "random" reference is made to the information provided above.

In one embodiment, the polar modified polypropylene (PMP) is a modified random propylene copolymer, wherein said random propylene copolymer comprises ethylene as the only comonomer unit.

Preferably, the units derivable from propylene constitutes the main part of the random propylene copolymer, i.e. at least 90.0 wt.-%, more preferably in the range of 92.0 to 99.5 wt.-%, yet more preferably of 92.5 to 98.0 wt.-%, even more preferably of 93.0 to 96.0 wt.-%, based on the total weight of the propylene copolymer. Accordingly, the amount of units derived from ethylene and/or $C_4$ to $C_{12}$ α-olefins, preferably derived from ethylene, in the random propylene copolymer is at most 10.0 wt.-%, more preferably in the range of 0.5 to 8.0 wt.-%, yet more preferably of 2.0 to 7.5 wt.-%, even more preferably of 4.0 to 7.0 wt.-%, based on the total weight of the random propylene copolymer. It is in particular appreciated that the random propylene copolymer only comprises units derivable from propylene and ethylene. The comonomer amounts given in this paragraph belong preferably to the random propylene copolymer which is not modified.

Additionally, it is appreciated that the random propylene copolymer has a melting temperature $T_m$ in the range of 125 to 145° C., more preferably ranges from 128 to 140° C. and most preferably ranges from 131 to 138° C. The melting temperature given in this paragraph is the melting temperature of the non-modified random propylene copolymer.

Additionally or alternatively, the random propylene copolymer, i.e. the non-modified random propylene copolymer, has a melt flow rate $MFR_2$ (230° C.) measured according to ISO 1133 in the range from 1 to 30 g/10 min, preferably in the range of 1 to 20 g/10 min, more preferably in the range of 1 to 10 g/10 min, and most preferably in the range of 2 to 6 g/10 min.

It is appreciated that the polar modified polypropylene (PMP) comprises groups derived from polar groups. In this context, preference is given to polar modified polypropylene (PMP) comprising groups derived from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar groups are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

In terms of structure, the polar modified polypropylene (PMP) is preferably selected from graft or block copolymers preferably of the above defined polypropylene, like the above defined random propylene copolymer.

Preferably the polar modified polypropylene (PMP), i.e. the coupling agent, is a polypropylene, like the random propylene copolymer as defined above in the section "the polar modified propylene (PMP) as coupling agent", grafted with such polar group.

Particular preference is given to using a polypropylene, like the random propylene copolymer as defined above in the section "the polar modified propylene (PMP) as coupling agent", grafted with maleic anhydride as the polar modified polypropylene (PMP), i.e. the coupling agent.

In one embodiment, the polar modified polypropylene (PMP) is a random propylene copolymer as defined above grafted with maleic anhydride. Thus in one specific preferred embodiment the polar modified polypropylene (PMP) is a random propylene ethylene copolymer grafted with maleic anhydride, more preferably wherein the ethylene content based on the total amount of the random propylene ethylene copolymer is in the range of 2.0 to 7.5 wt.-%, more preferably in the range of 4.0 to 7.0 wt.-%.

In order to achieve the desired dispersion of the carbon fibers (CF) in the polymer components ensuring that the fiber reinforced polymer composition provides the well-balanced mechanical properties such as high stiffness and impact at low density, it is appreciated that the polar modified polypropylene (PMP) comprises an amount of groups deriving from polar groups which is higher than that typically used in polar modified polypropylenes considered for polypropylenes.

Required amounts of groups deriving from polar groups in the polar modified polypropylene (PMP) are thus from 0.5 to 5.0 wt.-%, based on the total weight of the polar modified polypropylene (PMP). Preferably, the amount of groups deriving from polar groups in the polar modified polypropylene (PMP) are from 1.0 to 5.0 wt.-%, more preferably from 1.5 to 4.0 wt.-%, yet more preferably from 2.0 to 3.0 wt.-%, most preferably from 2.0 to 2.8 wt.-%, such as from 2.2 to 2.4 wt.-%, based on the total weight of the polar modified polypropylene (PMP).

Thus in one specific preferred embodiment the polar modified polypropylene (PMP) is a random propylene ethylene copolymer grafted with maleic anhydride, more preferably wherein the ethylene content based on the total amount of the random propylene ethylene copolymer is in the range of 2.0 to 7.5 wt.-%, more preferably in the range of 4.0 to 7.0 wt.-% and/or the amount of groups deriving from the maleic anhydride in the polar modified polypropylene (PMP) is from 1.0 to 5.0 wt.-%, more preferably 1.5 to 4.0 wt.-%, still more preferably from 2.0 to 3.0 wt.-%, most preferably from 2.0 to 2.8 wt.-%, such as from 2.2 to 2.4 wt.-%, based on the total weight of the polar modified polypropylene (PMP).

Preferred values of the melt flow index MFI (170° C.; 1.2 kg) measured in line with the general definitions of ISO 1133 for the polar modified polypropylene (PMP) are from 10 to 150 g/10 min, like in the range of 30 to 120 g/10 min. For example, the polar modified polypropylene (PMP) has a melt flow index MFI (170° C.; 1.2 kg) measured in line with the general definitions of ISO 1133 from 50 to 100 g/10 min, of from 60 to 80 g/10 min.

Preferred values of the melt flow rate $MFR_2$ (230° C.; 2.16 kg) for the polar modified polypropylene (PMP) are from 350 to 600 g/10 min, like in the range of 400 to 550 g/10 min.

Additionally or alternatively, it is appreciated that the polar modified polypropylene (PMP) preferably has a melting temperature $T_m$ in the range of 120 to 150° C., more preferably ranges from 125 to 145° C. and most preferably ranges from 130 to 140° C.

The polar modified polypropylene (PMP) can be produced in a simple manner by a two-step grafting process comprising a solid stage as a first step and a melt stage as a second step. Such process steps are well known in the art.

The polar modified polypropylene (PMP) is known in the art and commercially available. A suitable example is SCONA TSPP 3598 GB of BYK.

In one embodiment, the fiber reinforced polymer composition comprises the polar modified polypropylene (PMP) as defined above as the only polar modified polypropylene (PMP).

The Article

The invention is also directed to an article comprising the fiber reinforced polymer composition according to this invention. Preferably the article comprises at least 80 wt.-%, like 80 to 99.9 wt.-%, more preferably at least 90 wt.-%, like 90 to 99.9 wt.-%, yet more preferably at least 95 wt.-%, like 95 to 99.9 wt.-%, of the fiber reinforced polymer composition according to this invention. In one embodiment the article consists of the fiber reinforced polymer composition according to this invention.

Preferably, the article is a molded article, preferably an injection molded article or a foamed article.

The article can be a part of washing machines or dishwashers or automotive articles, especially of car interiors and exteriors.

Preferred automotive articles are selected from the group consisting of instrumental carriers, shrouds, structural carriers, bumpers, side trims, step assists, body panels, spoilers, dashboards, interior trims and the like.

Automotive articles are typically molded articles, preferably injection molded articles as well as foamed articles. Preferably the automotive articles, especially those defined in the previous paragraph are injection molded articles.

The fiber reinforced polymer composition of the present invention can be also used for the production of articles, preferably molded articles, more preferably injection molded articles as well as foamed articles.

In a further aspect, the present invention also refers to the use of the fiber reinforced polymer composition of the present invention for the production of articles, such as parts of washing machines or dishwashers as well as automotive articles, especially of car interiors and exteriors, like instrumental carriers, shrouds, structural carriers, bumpers, side trims, step assists, body panels, spoilers, dashboards, interior trims and the like.

In the following the invention is described in more detail.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy is used to quantify the isotacticity and regio-regularity of the polypropylene homopolymers.

Quantitative $^{13}C\{^1H\}$ NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics.

For polypropylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}$C $\{^1H\}$ NMR spectra were processed, integrated and relevant quantitative properties determined from the integrals using proprietary computer programs.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm] %=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio-defects:

$$P_{total}=P_{12}+P_{21e}$$

The mole percent of 2,1-erythro regio-defects was quantified with respect to all propene:

[21e] mol.-%=100*($P_{21e}/P_{total}$)

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}$C $\{^1H\}$ spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

MFR$_2$ (230° C.) is measured according to ISO 1133 (230° C., 2.16 kg load).

MFR$_2$ (190° C.) is measured according to ISO 1133 (190° C., 2.16 kg load).

MFR (170° C.) is measured in line with the general definitions of ISO 1133 (170° C., 1.2 kg load).

DSC analysis, melting temperature (Tm) and melting enthalpy (Hm), crystallization temperature (Tc) and crystallization enthalpy (Hc): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and crystallization enthalpy (Hc) are determined from the cooling step, while melting temperature and melting enthalpy (Hm) are determined from the second heating step.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Density of the polymer composition is measured according to ISO 1183-187. Sample preparation is done by compression molding in accordance with ISO 1872-2:2007.

The xylene cold solubles (XCS, wt.-%): Content of xylene cold solubles (XCS) is determined at 25° C. according to ISO 16152; first edition; 2005 Jul. 1

Intrinsic viscosity is measured according to DIN ISO 1628/1, October 1999 (in Decalin at 135° C.).

Tensile Modulus; Tensile strength are measured according to ISO 527-2 (cross head speed=1 mm/min; 23° C.) using injection molded specimens as described in EN ISO 1873-2 (dog bone shape, 4 mm thickness).

Charpy notched impact strength is determined according to ISO 179 1eA at −20 and 23° C. by using an 80×10×4 mm$^3$ test bars injection molded in line with EN ISO 1873-2.

Average fiber diameter is determined according to ISO 1888:2006(E), Method B, microscope magnification of 1000.

2. Examples

The following inventive examples IE1 to IE4 and comparative examples CE1 to CE3 were prepared by compounding on a co-rotating twin-screw extruder (ZSK 40 from Coperion).

The following process parameters were used:
throughput of 100 kg/h
screw speed of 100-150 rpm
barrel temperatures of 250° C. flat
die plate with 5 mm holes, whereby 3 holes were opened.

The polymer and the components different from the carbon fibers were fed to the extruder and melt-kneaded in the $4^{th}$ barrel of the extruder which consists of three kneading blocks (two times a KB 45/5/40, followed by a KB 45/5/20 LH) and a left-handed conveying element. The carbon fibers were added in the $6^{th}$ barrel using a side feeder. A second kneading zone located in the $8^{th}$ barrel and consisting of three kneading blocks (KB 45/5/20) was used to distribute the carbon fibers homogeneously. Moreover, two TME elements (one TME 22.5/20 and one TME 22.5/20 LH) located between the $8^{th}$ and the $9^{th}$ barrel were used to further distribute the carbon fibers.

Table 1 summarizes the composition of the inventive and comparative examples and their properties

TABLE 1

Overview of composition and mechanics for inventive and comparative examples

|  |  | IE 1 | IE 2 | IE 3 | IE 4 | CE 1 | CE 2 | CE 3 |
|---|---|---|---|---|---|---|---|---|
| H-PP1 | [wt.-%] | 90 |  |  | 45 |  |  |  |
| HECO | [wt.-%] |  | 90 | 93 | 45 |  |  |  |
| PP-2 | [wt.-%] |  |  |  |  | 94 | 94.9 | 95 |
| Carbon fibers | [wt.-%] | 5 | 5 | 2 | 5 |  |  |  |
| Glass fibers | [wt.-%] |  |  |  |  | 5 |  |  |
| Talc | [wt.-%] |  |  |  |  |  | 5 | 5 |
| NA11 | [wt.-%] |  |  |  |  | 0.1 |  |  |
| PMP | [wt.-%] | 5 | 5 | 5 | 5 |  |  |  |
| PMP2 | [wt.-%] |  |  |  |  | 1 |  |  |
| Density | [g/cm$^3$] | 950 | 950 | 923 | 950 | 987 | 996 | 997 |
| Tensile modulus | [MPa] | 4250 | 2690 | 1670 | 3192 | 2460 | 2758 | 2239 |
| Tensile strength | [MPa] | 60.5 | 33.6 | 24.1 | 43.6 | 50.1 | 42.6 | 39.4 |
| Charpy notched impact +23° C. | [kJ/m$^2$] | 2.2 | 7.5 | 8.3 | 3.9 | 3.8 | 2 | 3.7 |

"H-PP1" is the commercial propylene homopolymer HF955MO of Borealis AG having a melt flow rate $MFR_2$ (230° C.) of 19.5 g/10 min and a melting temperature of 167° C.; "HECO" was produced with the Spheripol® process from LyondellBasell in a plant having a prepolymerization reactor, two loop reactors and two gas phase reactors connected in series. The monomodal propylene homopolymer matrix was produced in the two loops; the disperse phase consisting of an ethylene-propylene rubber was produced in the two gas phase reactors. The catalyst used in the polymerization was the ZN104 catalyst commercially available from LyondellBasell, the cocatalyst was Triethylaluminium (TEA) and as an external donor dicyclopentyl dimethoxy silane was used. In general, the polymerization of the HECO can be carried out as described as in EP 2 251 375 A1. Polymerization conditions and properties of the HECO can be gathered from the following table 2.

TABLE 2a

Polymerization conditions of the HECO

|  |  | HECO D |
|---|---|---|
| Donor |  |  |
| Polymerization |  |  |
| Co/ED ratio | mol/mol | 8 |
| Co/TC ratio | mol/mol | 150 |
| Loop (Reactor 1) |  |  |
| Residence time | h | 0.5 |
| Temperature | ° C. | 70 |
| H2/C3 ratio | mol/kmol | 9.2 |
| C2/C3 ratio | mol/kmol | 0 |
| MFR$_2$ | g/10 min | 50 |
| XCS | wt.-% | 2.6 |
| C2 content | wt.-% | 0 |
| split | wt.-% | 35 |
| Loop2 (Reactor 2) |  |  |
| Residence time | h | 0.5 |
| Temperature | ° C. | 80 |
| H2/C3 ratio | mol/kmol | 9.2 |
| C2/C3 ratio | mol/kmol | 0 |
| MFR$_2$ | g/10 min | 50 |
| XCS | wt.-% | 2.6 |
| C2 content | wt.-% | 0 |

TABLE 2b

Polymerization conditions of the HECO

|  |  | HECO |
|---|---|---|
| GPR1 (Reactor 3) |  |  |
| Residence time | h | 0.3 |
| Temperature | ° C. | 80 |
| Pressure | kPa | 15 |
| H2/C2 ratio | mol/kmol | 140 |
| C2/C3 ratio | mol/kmol | 650 |
| MFR$_2$ | g/10 min | 22 |
| XCS | wt.-% | 24 |
| C2 content | wt.-% | 9.0 |
| split | wt.-% | 20 |
| GPR2 (Reactor 4) |  |  |
| Residence time | h | 0.3 |
| Temperature | ° C. | 85 |
| Pressure | kPa | 13 |

TABLE 2b-continued

| Polymerization conditions of the HECO | | | |
|---|---|---|---|
| | | | HECO |
| H2/C2 ratio | mol/kmol | | 140 |
| C2/C3 ratio | mol/kmol | | 650 |
| MFR$_2$ | g/10 min | | 10.5 |
| XCS | wt.-% | | 30 |
| C2 content | wt.-% | | 16 |
| split | wt.-% | | 10 |
| Polymer Properties | | | |
| MFR$_2$ | g/10 min | | 10.5 |
| XCS | wt.-% | | 30 |
| C2 (XCS, NMR) | wt.-% | | 38 |
| iV (XCS) | dl/g | | 2.2 |
| Flexural modulus ISO 178 | MPa | | 998 |
| NIS ISO 179 1eA 23° C. | kJ/m$^2$ | | 64.5 |
| NIS ISO 179 1eA −20° C. | kJ/m$^2$ | | 7.1 |

"PP-2" is the commercial propylene homopolymer HD120MO of Borealis AG having a melt flow rate MFR$_2$ (230° C.) of 8 g/10 min;

"Carbon fiber" is a non-woven fabric comprising 80 wt.-% of carbon fibers and has been produced by needle-punching: The carbon fibers have an average diameter of 7 µm.

"Glass fibers" is a glass fiber having an average diameter of 17 µm and is an endless roving before production, about 10 mm length after pelletizing;

"Talc" is a talc from IMIFabi having an average diameter of 2.4 µm;

"PMP" is the ethylene polypropylene copolymer (functionalized with maleic anhydride) "TSPP3598 GB" of BYK Co. Ltd, Germany, having a MFI (170° C.) of 71 g/10 min and a maleic anhydride content of 2.2-2.4 wt.-% wherein further the ethylene polypropylene copolymer has an ethylene content of 5.6 wt.-%;

"PMP2" is the commercial maleic anhydride functionalized polypropylene "Exxelor P01020" of Exxon Mobil with a density of 0.9 g/cm$^3$, an MFR$_2$ of 430 g/10 min and an MAH content of 2.33 mol.-%;

"NA11" is the α-nucleating agent sodium 2,2'-methylene bis-(4,6-di-tert. butylphenyl) phosphate of Adeka Corporation.

It can be gathered from table 1 that the inventive examples IE1 to IE4 comprising carbon fibers in combination with a specific polar modified polypropylene in a polypropylene matrix has well-balanced mechanical properties such as stiffness and impact, at reduced density and thus at light weight.

Figure 2:
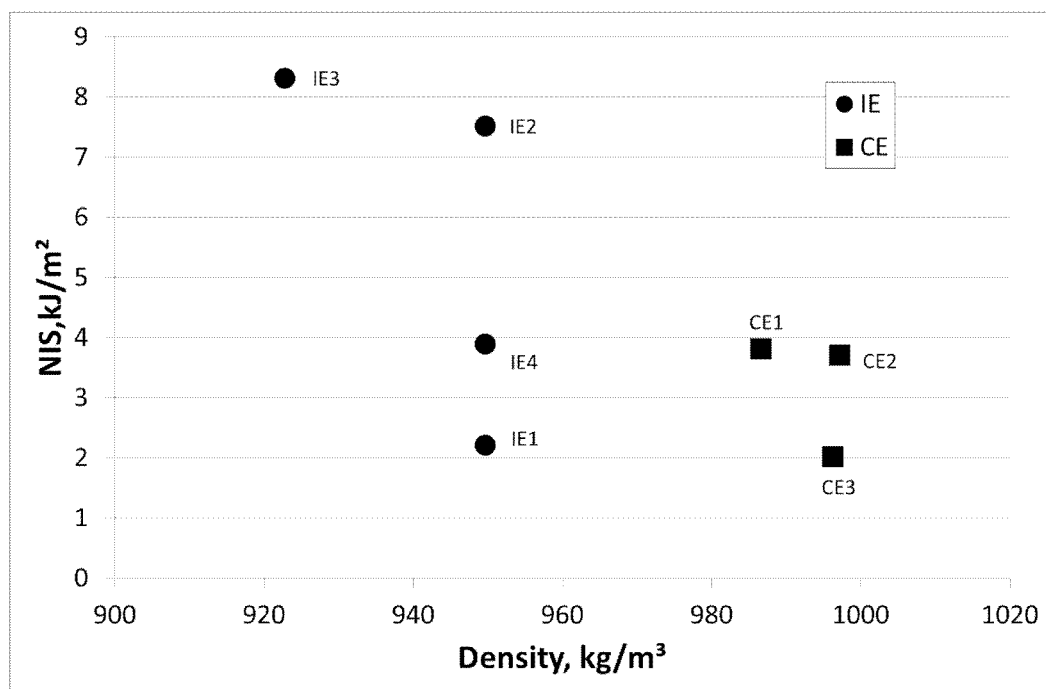
FIG. 2 shows the relationship between Charpy Notched Impact Strength (NIS) and density for the inventive and comparative examples.
Figure 3:
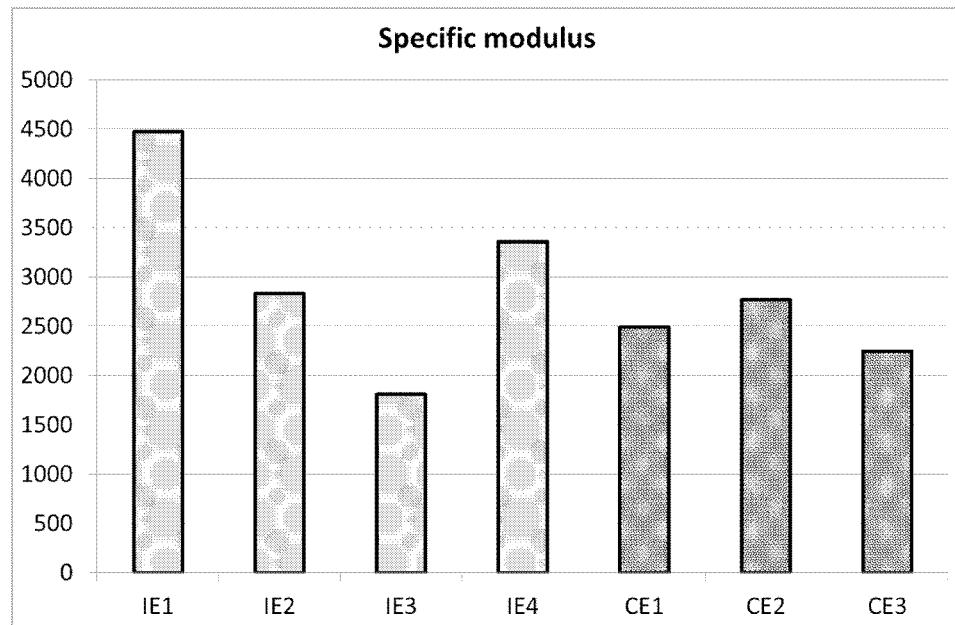
FIG. 3 shows the specific modulus of the inventive and comparative examples.
Figure 4:
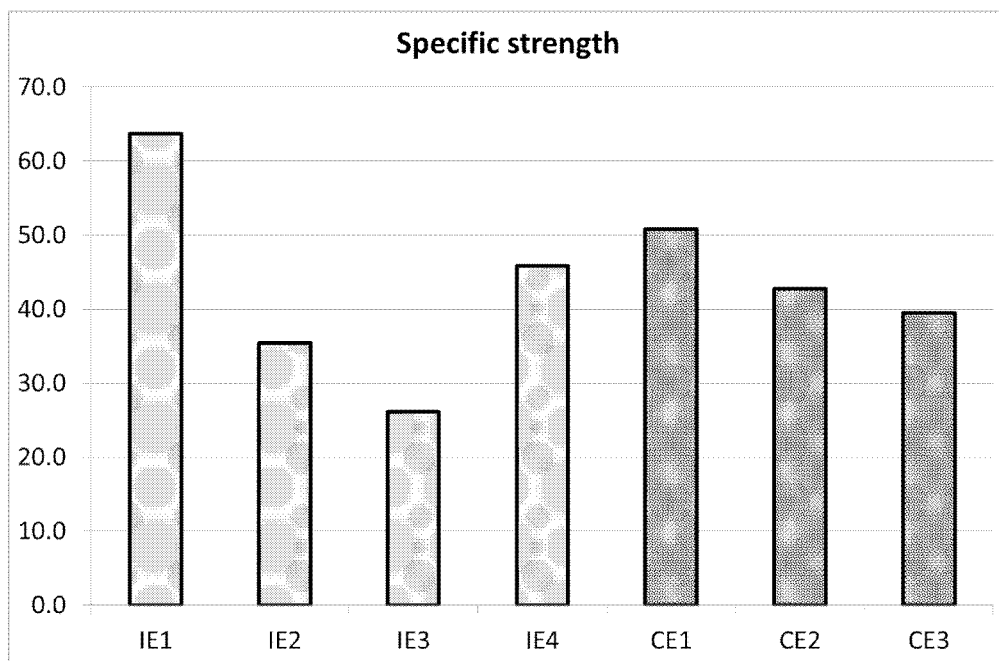
FIG. 4 shows the specific strength of the inventive and comparative examples.

The same can be gathered from FIGS. 1 and 2 showing the advantages in terms of mechanical properties of using carbon fibers in combination with a specific polar modified polypropylene in a polypropylene matrix compared to talc or glass fibers. In particular, tensile as well as impact performances are at a higher or comparable level for the inventive examples but with a significant lower density. In FIGS. 3 and 4, the specific modulus and strength of the materials are reported, i.e. modulus and strength are normalized by the density. In this regard, it can be gathered that the inventive examples are higher or at the same level as the comparative examples. With regard, to inventive example IE3 it is to be noted that the filler level is much lower such that lower values are obtained.

The invention claimed is:

1. A fiber reinforced polymer composition comprising:
   (a) from 65 to 98.9 wt. %, based on the total weight of the fiber reinforced polymer composition, of a polypropylene (PP);
   (b) from 1 to 10 wt. %, based on the total weight of the fiber reinforced polymer composition, of carbon fibers (CF); and
   (c) from 0.1 to 10 wt. %, based on the total weight of the fiber reinforced polymer composition, of a polar modified polypropylene (PMP) as coupling agent,
   wherein the polar modified polypropylene (PMP) comprises groups derived from polar groups in an amount of from 1 to 5 wt. %, based on the total weight of the polar modified polypropylene (PMP); and
   wherein the carbon fibers (CF) are in the form of a non-woven fabric.

2. The fiber reinforced polymer composition according to claim 1, wherein the polypropylene (PP) has:
   (a) a melt flow rate MFR$_2$ (230° C., 2.16 kg) measured according to ISO 1133 of not more than 100 g/10 min; and/or
   (b) a melting temperature T$_m$ of at least 130° C.

3. The fiber reinforced polymer composition according to claim 1, wherein the polypropylene (PP) is a propylene homopolymer (H-PP1) and/or a propylene copolymer (C-PP1).

4. The fiber reinforced polymer composition according to claim 3, wherein the propylene copolymer (C-PP1) is a heterophasic propylene copolymer (HECO).

5. The fiber reinforced polymer composition according to claim 1, wherein the non-woven fabric comprises at least 50 wt. % carbon fibers (CF), based on the total weight of the non-woven fabric.

6. The fiber reinforced polymer composition according to claim 1, wherein the carbon fibers (CF) comprise a sizing agent.

7. The fiber reinforced polymer composition according to claim 1, wherein the fiber reinforced polymer composition is free of fibers (F) being selected from the group comprising glass fibers, metal fibers, mineral fibers, ceramic fibers and mixtures thereof.

8. The fiber reinforced polymer composition according to claim 1, wherein the polar modified polypropylene (PMP) comprises groups derived from polar groups selected from the group consisting of acid anhydrides, carboxylic acids, carboxylic acid derivatives, primary and secondary amines, hydroxyl compounds, oxazoline and epoxides, and also ionic compounds.

9. The fiber reinforced polymer composition according to claim 1, wherein the polar modified polypropylene (PMP) is a propylene polymer grafted with maleic anhydride.

10. The fiber reinforced polymer composition according to claim 9, wherein the polar modified polypropylene (PMP) is a propylene copolymer grafted with maleic anhydride comprising ethylene as comonomer units.

11. The fiber reinforced polymer composition according to claim 1, wherein the fiber reinforced polymer composition further comprises at least one additive in an amount of up to 20 wt. %, based on the total weight of the fiber reinforced polymer composition.

12. The fiber reinforced polymer composition according to claim 1, wherein the fiber reinforced polymer composition has:
   (a) a density of equal or less than 0.985 g/cm$^3$; and/or
   (b) a tensile modulus according to ISO 527-2 of at least 2500 MPa; and/or (c) a tensile strength according to ISO 527-2 of at least 20 MPa.

13. An article comprising a fiber reinforced polymer composition according to claim 1.

14. The article according to claim 13, wherein the article is a molded article.

15. The article according to claim 13, wherein the article is a part of washing machines or dishwashers or automotive articles.

* * * * *